No. 765,418. PATENTED JULY 19, 1904.
H. H. DOW.
PROCESS OF REMOVING CARBON DIOXID FROM ALKALINE CARBONATES.
APPLICATION FILED JULY 22, 1903.
NO MODEL.
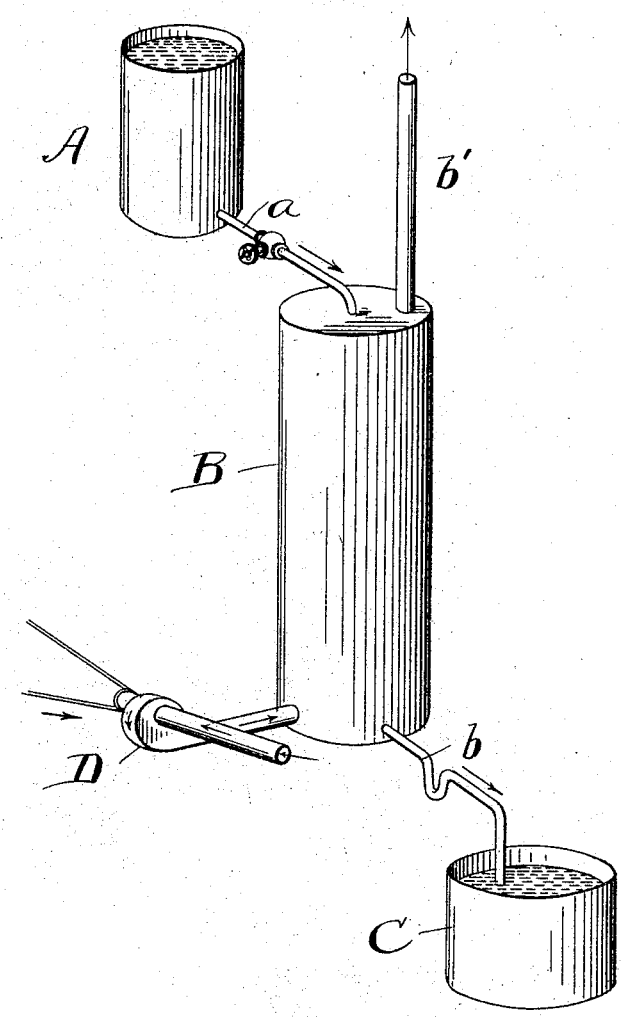

No. 765,418. Patented July 19, 1904.

UNITED STATES PATENT OFFICE.

HERBERT H. DOW, OF MIDLAND, MICHIGAN, ASSIGNOR TO THE DOW CHEMICAL COMPANY, OF MIDLAND, MICHIGAN, A CORPORATION OF MICHIGAN.

PROCESS OF REMOVING CARBON DIOXID FROM ALKALINE CARBONATES.

SPECIFICATION forming part of Letters Patent No. 765,418, dated July 19, 1904.

Application filed July 22, 1903. Serial No. 166,509. (No specimens.)

*To all whom it may concern:*

Be it known that I, HERBERT H. Dow, a citizen of the United States, and a resident of Midland, county of Midland, and State of Michigan, have invented a new and useful Improvement in Processes of Removing Carbon Dioxid from Alkaline Carbonates, of which the following is a specification, the principle of the invention being herein explained and the best mode in which I have contemplated applying that principle, so as to distinguish it from other inventions.

My invention relates to methods of removing carbon dioxid from alkaline carbonates by means of bromin-laden air.

Such invention consists of a process hereinafter fully described, and specifically set forth in the claims.

Heretofore alkaline bromids have been formed from free bromin by combining the latter with a hydrate of the alkali in solution; but if the source from which the bromin is being obtained contains any carbon dioxide the caustic solution will be converted first into a carbonate and then into a bicarbonate of the alkali. The bromin alone or in solution without air will not combine with a bicarbonate of an alkali, but will slowly combine with the normal carbonate, as shown by the following equation:

$$6K_2CO_3 + 6Br + 3H_2O = 5KBr + KBrO_3 + 6KHCO_3,$$

the bromin hence combining with but one-half the potassium present. I am aware that bromids have also been made by bringing bromin and carbon-dioxid laden air into contact with an alkaline carbonate and subsequently separating the bromin compounds from the excess of alkali by fractional crystallization. I therefore do not claim this process as being novel.

The annexed drawing and the following description set forth in detail one mode of carrying out the invention, such disclosed mode constituting but one of various ways in which the principle of the invention may be used.

Said annexed drawing illustrates diagrammatically an apparatus which is used for carrying out my improved process.

A receptacle A is provided with a suitable connection $a$, by means of which its contents may be discharged into the top of a coke, lunge-plate, or other similar tower B, by means of which a liquid may upon passage therethrough be comminuted, as will be understood, in order to give it a large superficial area. The bottom of the tower is provided with a connection $b$, which discharges into a suitable receptacle C. A blower D is connected with the bottom of the tower and forces brominladen air up through same, such air being discharged into the atmosphere through a suitable vent $b'$. The bromin-laden air is obtained by means of any known process, such as that described in my reissued Letters Patent No. 11,232, dated April 12, 1892.

My method consists first in bringing bromin-laden air into contact with the carbonates of any of the alkaline metals either in solution or in a solid state, such bromin-laden air being such as has not previously been used for the same purpose, and hence is practically free from carbon dioxid. By air practically free from carbon dioxid I mean untreated atmospheric air to which no carbon dioxid has been artificially added—that is, atmospheric air containing a normal amount of carbon dioxid. The smaller the per cent. of carbon dioxid in the air employed the more complete will be the removal of the carbon dioxid from the alkali. Such air is after having been subjected to the action of such carbonates, and so freed from bromin and containing the carbon dioxid liberated in the reaction from the carbonates, discharged into the atmosphere, thus carrying off and removing completely from the system the carbon dioxid set free in the the reaction, as is hereinafter more fully explained. One method of carrying out such process by means of the apparatus above described is to bring a cold solution of sodium carbonate $Na_2CO_3$, placed in a receptacle A, into contact with the bromin-laden air forced through the tower B by blower D, the reaction being

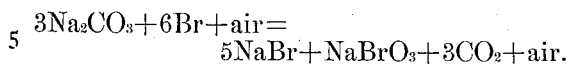

When bromin unaccompanied by a large excess of air practically free from carbon dioxid is brought into contact with a solution of sodium carbonate, the following reaction takes place:

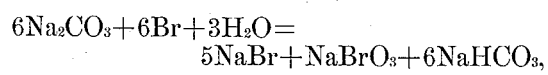

and bromin under these conditions will not, as previously stated, combine with the sodium bicarbonate formed, so that only one-half of the sodium in the normal carbonate is available for the production of bromid and bromate; but I have found that when the bromin is accompanied by a large excess of air practically free from carbon dioxid nearly all of the alkali metal present may be made to combine with the bromin, carbon dioxid being set free and carried off by the large excess of air present.

In the method as described in my said reissued Letters Patent the air used as a carrier of the bromin from the brine to the absorbent was used over and over again. By this means it is not possible to convert more than about half the alkaline metal in a normal carbonate into bromid and bromate, because the carbon dioxid at first set free is not removed, but remains in the system and continues to circulate in contact with the absorbing solution. Thus a condition of equilibrium is soon established, when no further amount of carbon dioxid will be formed. In my new method the bromin-laden air after passing over a very large absorbing-surface, by means of which nearly all the bromin is absorbed, is then discharged directly into the atmosphere, thus completely removing from the system the carbon dioxid set free. By this means I am able on a commercial scale to convert from ninety to ninety-seven per cent. of the alkali metal present into bromid and bromate.

Instead of air any other gas inert as regards the chemical action upon the particular substances used in the process and practically free from carbon dioxid may be used, and as an absorbent material the carbonates of other than the alkali metals may be employed.

The water used in this process serves merely as a vehicle to bring the carbonate into contact with the bromin-laden air, it being possible to carry out the process with a dry carbonate. The most satisfactory method, however, is that which employs a solution.

In the above reactions a certain amount of hypobromite is formed in place of part of the bromid and bromate; but the substance is quite unstable and is ultimately converted into bromid and bromate.

The amount of ordinary pure untreated air necessary to remove the bromin from its solution is also a sufficient amount to remove the carbon dioxid from the alkali under the conditions above described. In actual practice one thousand pounds of air will remove about two pounds of carbon dioxid.

Other modes of applying the principle of my invention may be employed instead of the one explained, change being made as regards the process herein disclosed, provided the means stated by any one of the following claims or the equivalent of such stated means be employed.

I therefore particularly point out and distinctly claim as my invention—

1. The process of removing carbon dioxid from an alkaline carbonate which consists in bringing such carbonate into contact with bromin in combination with a large amount of fresh gas inert as regards the chemical action upon such carbonate and bromin, and then discharging said gas from the system.

2. The process of removing carbon dioxid from an alkaline carbonate which consists in bringing a solution of such carbonate into contact with bromin in combination with a large amount of fresh gas inert as regards the chemical action upon such carbonate and bromin, and then discharging said gas from the system.

3. The process of removing carbon dioxid from sodium carbonate which consists in bringing such carbonate into contact with bromin in combination with a large amount of fresh gas inert as regards the chemical action upon such carbonate and bromin, and then discharging said gas from the system.

4. The process of removing carbon dioxid from sodium carbonate which consists in bringing a solution of such carbonate into contact with bromin in combination with a large amount of fresh gas inert as regards the chemical action upon such carbonate and bromin, and then discharging said gas into the atmosphere.

5. The process of removing carbon dioxid from an alkaline carbonate which consists in bringing such carbonate into contact with fresh air containing bromin, and then discharging said air from the system.

6. The process of removing carbon dioxid from an alkaline carbonate which consists in bringing a solution of such carbonate into contact with fresh air containing bromin, and then discharging said air from the system.

7. The process of removing carbon dioxid from sodium carbonate which consists in bringing such carbonate into contact with fresh air containing bromin, and then discharging said air from the system.

8. The process of removing carbon dioxid from sodium carbonate which consists in bringing a solution of such carbonate into contact with fresh air containing bromin, and then discharging said air into the atmosphere.

Signed by me this 15th day of July, 1903.

HERBERT H. DOW.

Attest:
   D. T. DAVIES,
   G. W. SAYWELL.